Figure 1:
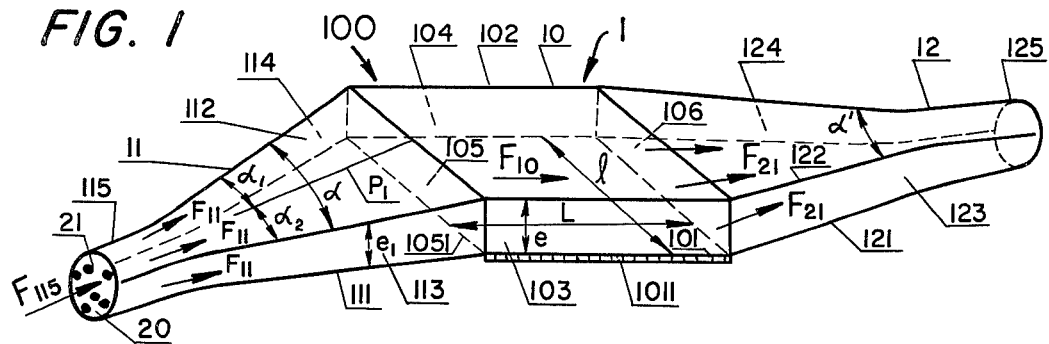

United States Patent [19]

Durand

[11] 4,101,717
[45] Jul. 18, 1978

[54] ELECTROCHEMICAL GENERATORS WITH A SEDIMENTATION BED AND DIVERGENT FEED

[75] Inventor: Pierre Durand, Clermont-Ferrand, France

[73] Assignee: Compagnie Generale des Etablissements Michelin, Clermont-Ferrand, France

[21] Appl. No.: 821,759

[22] Filed: Aug. 4, 1977

[30] Foreign Application Priority Data

Aug. 6, 1976 [FR] France .................. 76 24466

[51] Int. Cl.² ............................................. H01M 8/04
[52] U.S. Cl. ........................................ 429/15; 429/27
[58] Field of Search ..................... 429/12, 13, 14, 15, 429/27

[56] References Cited
U.S. PATENT DOCUMENTS

| | | | |
|---|---|---|---|
| 3,527,617 | 9/1970 | Prober | 429/15 |
| 4,038,458 | 7/1977 | Jacquelin | 429/15 |

Primary Examiner—John H. Mack
Assistant Examiner—H. A. Feeley
Attorney, Agent, or Firm—Brumbaugh, Graves, Donohue & Raymond

[57] ABSTRACT

A process for the production of electric current in an electrochemical generator comprising a cell having a compartment contaning a liquid electrolyte, the surface of the lower face of the compartment being formed by all or part of the surface of an electron collector arranged on the electrolyte side, this process consisting in creating a flow through the compartment of the electrolyte containing active solid particles or solid particles transporting an active material, the density of the particles being greater than the density of the electrolyte, is characterized by the fact that a divergence of the streamlines of the flow is brought about before the flow penetrates into the compartment and by the fact that the particles move within the compartment in the form of a sedimentation bed which is contiguous to the surface of the lower face and substantially homogeneous over the entire width of the lower face, the sedimentation bed being entrained by the electrolyte.

30 Claims, 9 Drawing Figures

U.S. Patent  July 18, 1978  Sheet 1 of 3  4,101,717

ELECTROCHEMICAL GENERATORS WITH A SEDIMENTATION BED AND DIVERGENT FEED

The present invention relates to processes for the production of electric current utilizing electrochemical reactions and to generators employing these processes. These generators have a cell with at least one anode compartment and one cathode compartment.

The invention relates particularly to generators of this type having a compartment which contains a liquid electrolyte in which solid particles are present, the electrolyte and the particles being in movement. This compartment comprises a so-called "electron collector" member which is a conductor of electricity and is intended to collect the electric charges liberated during the electrochemical reaction carried out in the compartment or to deliver the electric charges necessary for this reaction.

These particles may, on the one hand, be formed in their entirety of a material which participates in the electrochemical reaction and called active material. This is true in particular of fuel particles, of for instance anode active metals.

These particles may, on the other hand, be partially active and/or serve as support for at least one active material. This is true in particular of particles whose electrochemically inactive center is covered by at least one solid, liquid or gaseous active material, the center then acting as a transport agent for the active material and possibly as a catalyst.

The invention relates more particularly to generators through at least one of the compartments of which there is created a flow of a liquid electrolyte containing solid particles in accordance with the above definition which are in intermittent contact with the electron collector so as to favor the diffusion of the active material or of the products resulting from the electrochemical reaction.

In order to increase the specific power of these generators, the applicant, in another French patent application No. 76/24,465, filed Aug. 6, 1976, entitled "Electrochemical Generators with a Sedimentation Bed", corresponding to U.S. application Ser. No. 821,766, filed Aug. 4, 1977, now U.S. Pat. No. 4,092,461, May 30, 1978, has proposed creating such a flow in said compartment that the particles, whose density is greater than that of the electrolyte, form a sedimentation bed contiguous to the lower face of the compartment, the surface of said lower face being formed, at least in part, by all or part of the surface of an electron collector which is arranged on the electrolyte side.

The particles, which are thus concentrated by way of preference due to their weight in the vicinity of the lower face of the compartment within a space known as the "sedimentation bed", are entrained by the electrolyte.

The movements of the particles within said sedimentation bed assure a substantial current density while facilitating the diffusion phenomena. For this purpose, it may be advantageous to provide the lower face with elements in relief arranged above a base surface, said base surface being possibly at least in part immaterial. In the following, the expression "lower face" of the compartment will refer either to the actual surface of said face when it does not have any elements in relief, or else its base surface when it does have elements in relief, the expression "surface" of the lower face designating its actual surface.

In order to form suitably such a sedimentation bed, it is stipulated in the aforementioned application that any normal to the lower face of the compartment, which normal is directed towards the electrolyte, makes a small or zero angle, and in any case an angle of less than 90°, with the ascendent vertical.

In order to facilitate the flow, the upper face and the lower face of the compartment may form an angle converging in the direction of flow, which angle is advantageously at most equal to 10° and preferably at most equal to 1°.

The principal parameters which are involved in the production of the sedimentation bed are the following:

$d_0$ = density of the particles
$d_1$ = density of the electrolyte
D = average diameter of the particles in the electrolyte,
u = average velocity of the flow in the compartment, that is to say the ratio:

$$\frac{\text{total volumetric flow of the particles and the electrolyte}}{\text{average cross section of the flow vein}}$$

this average cross section being measured perpendicular to the average direction of flow within the compartment at a point located substantially in the center of the compartment, $\mu$ = viscosity of the electrolyte,
e = average distance between the lower and upper faces of the compartment,
L = average length of the compartment,
l = average width of the compartment, e, L and l being measured, as in the case of the average cross section, at a point located substantially in the center of the compartment, the measurement being made perpendicular to the lower face in the case of e, parallel to the average direction of flow within the compartment in the case of L, and perpendicular to said direction in the case of l, R = Reynolds number = $2 d_1 e u/\mu$ v/V being the ratio between the total volume v of the particles in the compartment and the total volume V of electrolyte in the compartment at any given instance. Advantageously, $d_0$ is at least equal to 2.5; $d_1$ is at most equal to 1.6; D is at least equal to 30 microns; u is between 5 m/minute and 60 m/minute; e is at most equal to 1cm; the ratio l/e is at least equal to 10; L is between 10cm and 1m, L varying in the same direction as the ratio $e^a u^b \mu^c/(d_0-d_1) d_D 2f$, a, b, c, d and 2f being positive exponents; R is at most equal to 4,000; v/V is at most equal to 0.30; $\mu$ is at most equal to 0.01 poiseville. Preferably, $d_0$ is at least equal to 4; $d_1$ is at most equal to 1.4; d is at least equal to 40 microns; u is between 10 and 30 m/minute; e is between 1mm and 5mm; l/e is at least equal to 20; L is between 20cm and 60cm; R is at most equal to 3,000; v/V is at most equal to 0.15; and $\mu$ is at most equal to 0.005 poiseville.

A homogeneous distribution of the particles over the entire width of the lower face of the compartment is defined in the following manner:

Let w be a fractional volume located at any given distance x from the entrance to the compartment, this distance being measured parallel to the average velocity of flow in the compartment. This fractional volume w, contained between the lower face and the upper face of the compartment, is limited laterally by a cylinder which is substantially perpendicular to the lower face and surrounds a small portion s of given shape and area of said lower face. The number of particles which at a given moment are contained within the fractional volume $w$ is substantially constant, whatever the position of the portion s, over the entire width of the lower face, the distance $x$ remaining constant.

In order that the so-called "sedimentation bed" generators described above may operate satisfactorily, it is necessary that the particles which penetrate into the compartment be distributed substantially homogeneously over the entire width of the lower face. As a matter of fact, if the particles are distributed heterogeneously, such heterogeneity subsists in the sedimentation bed when the bed moves within the compartment.

The reason for this is that the flow of the electrolyte is of practically zero turbulence. The sedimentation bed then has, on the one hand, regions in which the concentration of particles is too low, leading to a substantial loss of the power of the generator, and, on the other hand, regions in which the concentration of particles is excessive, leading to an attachment of the particles to the surface of the electron collector and therefore to the clogging of the compartment, which makes the compartment unusable.

The object of the invention is to avoid these drawbacks. Therefore, the process for the production of electric current utilizing electrochemical reactions in a generator comprising at least one cell having at least one compartment containing a liquid electrolyte and having an inlet, an outlet, an upper face and a lower face, the surface of the lower face being formed at least in part by all or part of the surface of at least one electron collector arranged on the electrolyte side, said process consisting in creating a flow through the compartment of the electrolyte containing solid particles which are at least partially active and/or solid particles transporting at least one active material, the density of the particles being greater than the density of the electrolyte, is characterized by the fact that a divergence of the streamlines of the flow is brought about before the flow penetrates into the compartment so as to obtain a substantially homogeneous distribution of the particles at the inlet to the compartment over the entire width of the lower face, and by the fact that, at least in a portion of the compartment, the particles move in the form of a sedimentation bed which is contiguous to the surface of the lower face and substantially homogeneous over the entire width of the lower face, the sedimentation bed being entrained by the electrolyte.

By "streamline" there is meant a curve which is tangent at each of its points to the velocity vector at such point.

The invention also concerns electrochemical generators employing the said method.

The invention will be readily understood by the aid of the following figures relating to nonlimitative embodiments.

Figure 2:
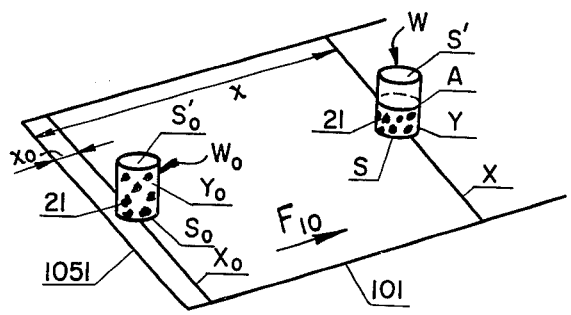
Figure 3:
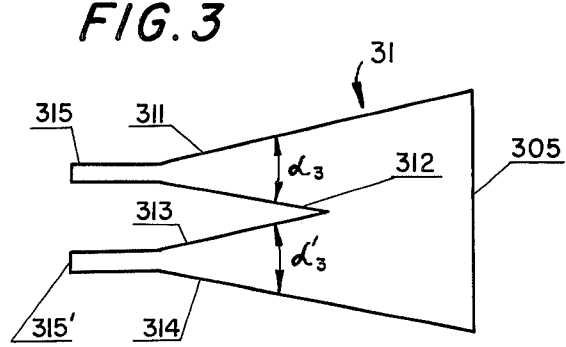
Figure 4:
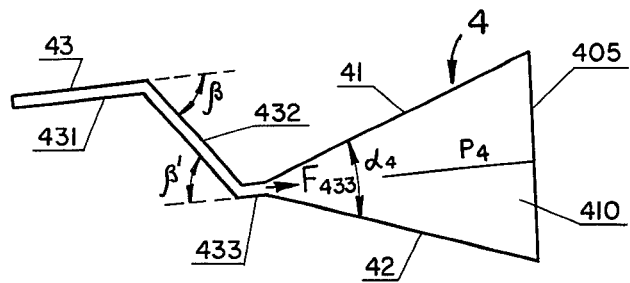
Figure 5:
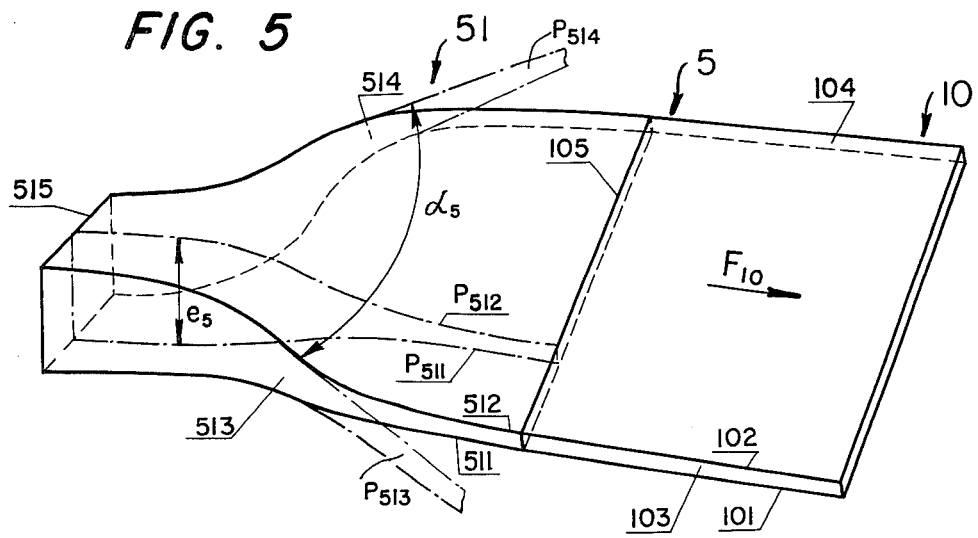
Figure 6:
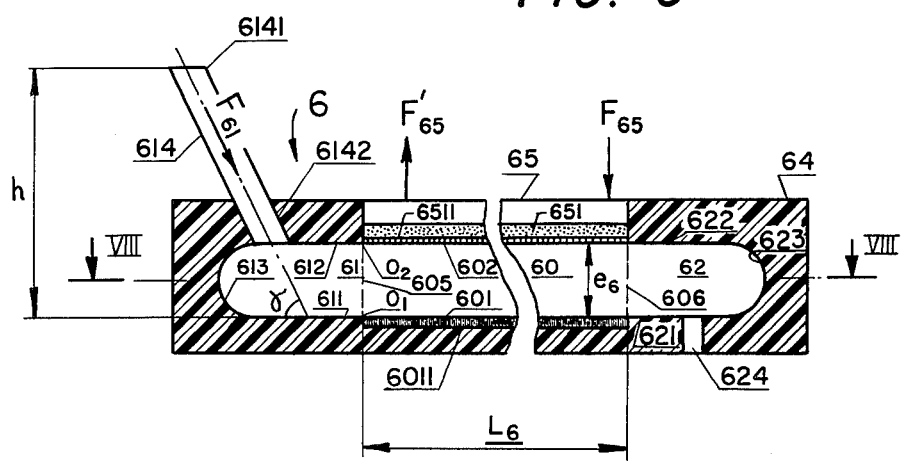
Figure 7:
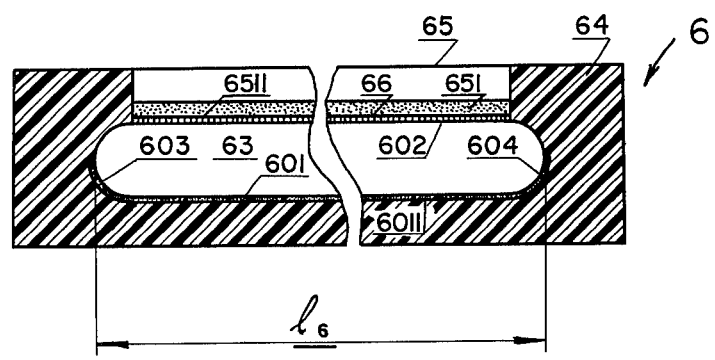
Figure 8:
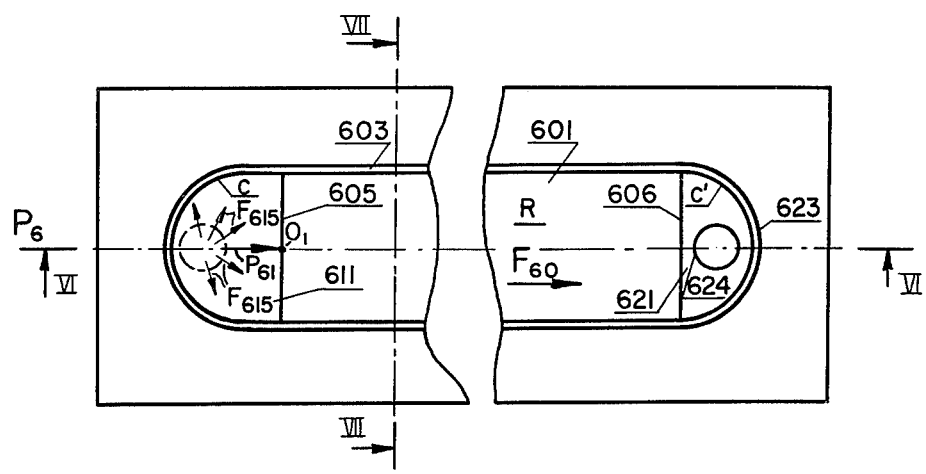
Figure 9:
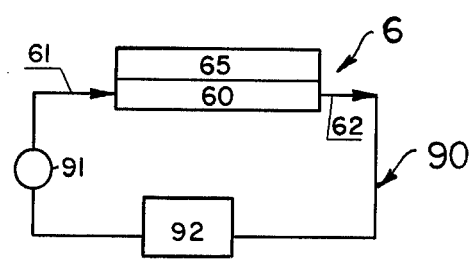

In these figures:

FIG. 1 shows schematically a generator in accordance with the invention formed of a cell comprising a compartment with a sedimentation bed, a feed device and an evacuation device, FIG. 2 shows schematically a portion of the lower face of the compartment shown in FIG. 1, FIG. 3 shows schematically, in top view, another feed device in accordance with the invention, FIG. 4 shows schematically, in top view, still another feed device in accordance with the invention, FIG. 5 shows schematically yet another feed device in accordance with the invention, FIG. 6 shows schematically another cell in accordance with the invention in section along a plane of symmetry (VI—VI in FIG. 8) parallel to the average direction of flow within the compartment and perpendicular to the lower face of said compartment, FIG. 7 shows schematically the cell of FIG. 6 in section along a plane (VII—VII in FIG. 8) perpendicular to the average direction of flow within said compartment, FIG. 8 shows schematically the cell of FIGS. 6 and 7 in section along a plane (VIII—VIII in FIG. 6) parallel to the lower face of said compartment, seen from above, FIG. 9 shows schematically a generator constituting a connection of the cell shown in FIGS. 6 to 8.

Referring to FIG. 1, 1 is a generator in accordance with the invention composed of a cell 100. This cell 100 has a compartment 10 defined by a lower face 101 which is formed by the electrically conductive upper face of an electron collector 1011.

The compartment 10 is also bounded by an upper face 102, formed by the lower face of another compartment (not shown) of the generator 1, and by the side faces 103 and 104.

The lower and upper faces 101 and 102 are substantially flat, horizontal and of identical rectangular shape, and the side faces 103 and 104 are substantially flat, parallel, vertical and rectangular. The compartment 10 is connected at its open end 105, known as the compartment inlet, with the feed device 11. The compartment 10 is furthermore connected to the evacuation device 12 at its open end 106, called the compartment outlet.

The feed device 11 has a lower face 111 and an upper face 112, these faces being substantially flat and horizontal. The feed device 11 furthermore has two opposite side faces 113 and 114, which are substantially flat and vertical. The side faces 113 and 114 form with each other an angle $\alpha$ which diverges towards the inlet 105 of the compartment 10. The plane bisecting the angle $\alpha$ is the plane substantially perpendicular to the lower face 111 and dividing the angle $\alpha$ into two equal angles $\alpha_1$ and $\alpha_2$. This bisecting plane, represented by its trace $P_1$ on the upper face 112, is preferably a plane of symmetry for the compartment 10 and for the feed device 11. The faces 111, 112, 113 and 114 of the feed device 11 are connected to the faces 101, 102, 103 and 104, respectively, of the compartment 10.

The feed conduit 115 constitutes the inlet of the feed device 11 opposite the opening 105, this feed conduit 115 connecting with the opposite faces 113 and 114 at the place where they are closest to each other.

The average direction of flow in the feed conduit 115, which direction is oriented in the direction indicated by the arrow F115, is parallel to the lower face 111 of the feed device 11. The real or average inside diameter Dc of the feed conduit 115 is small relative to the width l of the compartment 10, the ratio l/DC being preferably at least equal to 3 and more preferably yet at least equal to 5. When the feed conduit 115 is not a cylinder of revolution, its average diameter is calculated by the formula 4 S/P, S being the area of its cross section measured perpendicular to the average direction of flow F115 in said conduit, and P being the perimeter of said cross section.

The ratio between the maximum and minimum linear dimensions of this cross section is preferably equal to at most 5, and even more preferably equal to at most 3, a ratio of 1 obviously corresponding to a circular cross section.

A liquid electrolyte 20 containing solid particles 21 whose density is greater than the density of the electrolyte 20 is introduced into the feed device 11 via the feed conduit 115. The angle $\alpha$ is selected preferably at most equal to 20° and even more preferably at most equal to 15°.

Thus, in accordance with a first preferred variant, one brings about a uniform divergence of the streamlines of the flow before the electrolyte 20 and the particles 21 enter into the compartment 10, said divergence being represented by the arrows F11.

In this way, one obtains a practically homogeneous distribution of the particles 21 at the inlet 105 to the compartment 10 over the entire width of the lower face 101, as shown in FIG. 2.

$s_0$ is a small constant portion of area of the lower face 101 of the compartment 10, which portion is located at a small distance $x_0$ from the line 1051 of the lower face 101, said line 1051 corresponding to the inlet 105 of the compartment 10. The cylinder $y_0$, which is substantially perpendicular to the lower face 101 and surrounds the portion $s_0$, defines the fractional volume $w_0$ between the lower face 101 and the upper face 102, which is represented by its portion $s'_0$ surrounded by the cylinder $y_0$.

The number of particles 21 present at a given moment in the fractional volume $w_0$ is substantially constant, whatever the position of $s_0$ on the line $X_0$ located at the distance $x_0$ from the line 1051, said distance being measured parallel to the average direction of flow F10, that is to say whatever the position of this fractional volume in the vicinity of the inlet 105 of the compartment 10.

$w$ is a fraction of the volume of the compartment 10 in which the particles 21 are sedimented, said fractional volume $w$ being bounded in a manner similar to the fractional volume $w_0$ by the cylinder y, the small portion of constant area $s$ of the lower face 101 and the portion $s'$ of the upper face 102, $w$ being located at the distance $x$ from the line 1051; the line A represents the upper level of the sedimentation bed (not shown) of particles 21 in the fractional volume $w$. In accordance with the invention, due to the homogeneity of distribution of the particles at the inlet of the compartment, the sedimentation bed is homogeneous over the entire width of the compartment, that is to say the number of particles 21 in the fractional volume $w$ is substantially constant, whatever the position of the portion $s$ on the line X located at the distance $x$ from the line 1051, said distance being measured parallel to the average direction of flow directed along the arrow F10.

The particles 21 shown in the fractional volume $w_0$ are not sedimented, but this device also offers the advantage, in accordance with another variant embodiment, of permitting a sedimentation of the particles 21 in the feed device 11 along a sedimentation bed which is homogeneous over the entire width of the lower face 111 of the feed device 11, at least in the vicinity of the inlet 105, the particles 21 then penetrating into the compartment 10 in the form of a sedimentation bed, which still further increases the power of the generator.

In accordance with another embodiment of the invention, more than one divergent part can be provided in the feed devices.

FIG. 3, for instance, shows a feed device 31 having four vertical side faces opposite each other in pairs, the opposite side faces 311 and 312 forming the angle $\alpha_3$ between each other, the opposite side faces 313 and 314 forming the angle $\alpha'_3$ between each other, and the angles $\alpha_3$ and $\alpha'_3$ which are preferably equal, diverging towards the inlet 305 of a compartment (not shown). The feed conduit 315 is connected to the pair of opposite side faces 311 and 312 at the place where they are closest together. Likewise, the feed conduit 315' is connected to the pair of opposite side faces 313 and 314 at the place where they are closest together. This arrangement is, for instance, useful when the generator may suffer lateral inclinations during its operation.

FIG. 4 shows another feed device 4 corresponding to another embodiment of the invention. The feed device 4 has two opposite vertical side faces 41 and 42 forming with each other the angle $\alpha_4$ which diverges in the direction towards the inlet 405 of a compartment (not shown). The feed conduit 43 is connected to the opposite side faces 41 and 42 at the place where they are closest together.

This feed conduit 43 has three linear portions 431, 432, 433, numbered in the direction of flow. The average direction of the flow directed along the arrow F433 in the furthest downstream portion 433 is substantially parallel to the horizontal lower face 410 of the feed device 4 and it is located substantially in the plane $P_4$ which bisects the angle $\alpha_4$. The linear portions 431 and 432 determine an elbow angle $\beta$, the linear portions 432 and 433 similarly determine an elbow angle $\beta'$, the angles $\beta$ and $\beta'$ corresponding to the modifications in the average direction of flow in the feed conduit 43 at the places of these elbows. Such an arrangement makes it possible to avoid congestion of the central portion of the generator, the upstream portion 431 of the feed conduit 43 causing the electrolyte and the particles to arrive laterally. The angles $\beta$ and $\beta'$ are preferably between 70° and 90°; they permit a homogeneous distribution of the particles (not shown) in the electrolyte (not shown) before the flow debouches into the divergent portion corresponding to the angle $\alpha_4$.

FIG. 5 shows another variant embodiment of the invention. The generator 5 comprises the compartment 10 shown in FIG. 1 and a feed device 51 comprising a feed conduit 515 at its end opposite the inlet 105 of the compartment 10.

The lower face 511 and the upper face 512 of the feed device 51 are curved and connect tangentially with the lower face 101 and upper face 102 of the compartment 10. Let $P_{51}$ be a plane parallel to the average direction F10 of the flow in the compartment 10 and perpendicular to the lower face 101 of said compartment 10, the plane $P_{51}$ being represented in FIG. 5 by its traces $P_{511}$ and $P_{512}$ on the lower face 511 and upper face 512 of the feed device 51. $e_5$ is the distance between the traces $P_{511}$ and $P_{512}$ at any point in the plane $P_{51}$, in the feed device 51, this distance being measured perpendicular to the average flow direction F10.

The lower face 511 and upper face 512 of the feed device 51 are curved in such a manner that the distance $e_5$ is reduced progressively in the direction towards the inlet 105 of the compartment 10 over at least a portion of the feed device 51. The same result can be obtained if one of the faces 511 and 512 is flat.

The opposite side faces 513 and 514 of the feed device 51 are portions of cylinders whose generatrices are perpendicular to the extension of the lower face 101 of the compartment 10. These cylinders have a curved shape and they connect tangentially with the side faces 103 and 104 of the compartment 10.

P513 is a plane tangent to the side face 513, and P514 is a plane tangent to the opposite side face 514, the planes P513 and P514 being such that they form with each other a maximum angle $\alpha_5$ corresponding to the angle of divergence of the opposite side faces 513 and 514 in the direction of the inlet 105 of the compartment 10.

The progressive reduction of the distance $e_5$ permits an angle of divergence $\alpha_5$ which is substantially greater than 20°, and the value thereof may reach or even exceed 90°. This high value of the angle of divergence $\alpha_5$ is retained even if the side faces 513 and 514, instead of being curved, are flat like the side faces 113 and 114 shown in FIG. 1. One can thus also decrease the length of the feed device by more than half. The tangential connections of the generator 5, at the location of the inlet 105 of the compartment 10 between the faces 511, 512, 513, 514 of the feed device 51 and the faces 101, 102, 103, 104 of the compartment 10, decrease the turbulences at the inlet 105 of the compartment 10 and further improve the homogeneity of the sedimentation bed in said compartment.

FIGS. 6 to 8 show a different cell 6 in accordance with the invention. The cell 6 has a compartment 60, a feed device 61 and an evacuation device 62, these three elements 60, 61 and 62 forming the cavity 63 within a rigid insulating block 64, made for instance of plastic material.

The compartment 60 has a lower face 601 and an upper face 602 which are flat, horizontal, and arranged one above the other and have the shape of two identical rectangles R.

These faces 601 and 602 are connected by two side faces 603 and 604 having the shape of semi-cylinders of revolution, the concavities of these side faces 603 and 604 being arranged toward the electrolyte. The upper face 602 is formed by the lower face of another compartment 65 of the cell 6. The lower face 601 is formed by at least one portion of the surface arranged on the electrolyte side of an electron collector 6011 which is made, for instance, of a metal sheet. The compartment 60 is connected by its inlet 605 to the feed device 61 and by its outlet 606 to the evacuation device 62. The feed device 61 has a flat lower face 611 extending the lower face 601 of the compartment 60 and a flat upper face 612 extending the upper face 602 of the compartment 60. These faces 611 and 612 are bounded by identical semicircles c whose centers $O_1$ and $O_2$ are located in the inlet 605 of the compartment 60. The lower face 611 and the upper face 612 of the feed device 61 are connected by a side face 613 of semi-toroidal shape, the concavity of said side face 613 being arranged toward the electrolyte. The feed device 61 furthermore has a linear feed conduit 614 which debouches onto the upper face 612, preferably near the side face 613 of the feed device 61. The feed device 61 and the compartment 60 have a common plane of symmetry $P_6$ perpendicular to the lower faces 601 and 611 and to the planes defining the inlet 605 and the outlet 606 of the compartment 60, the plane $P_6$ passing, of course, through the centers $O_1$ and $O_2$. The feed conduit 614 is directed in the direction F61 towards the lower face 611 of the feed device 61 said direction being included in the plane of symmetry $P_6$. This direction F61 represents the average direction of flow in the feed conduit 614; it is obviously identical with the axis of said feed conduit, when the conduit has one. The direction F61 forms with the trace P61 of the plane of symmetry $P_6$ on the lower face 611 of the feed device 61 an angle $\gamma$ which may vary from 20° to 90° and which is preferably between 75° and 85°, the trace P61 being directed towards the inlet 605.

The distance h between the upper end 6141 of the feed conduit 614 and the lower face 611 of the feed device 61 is advantageously at least equal to $2D_c$ and preferably at least equal to $4D_c$, $D_c$ being the actual or average inner diameter of the cross section of the feed conduit 614, measured perpendicular to the direction F61, the definition of the average diameter having been given previously.

A liquid electrolyte (not shown) containing solid particles (not shown) is introduced into the feed device 61 through the feed conduit 614. The arrangement described thus makes it possible to obtain a rapid divergence of the streamlines, as is indicated diagrammatically in FIG. 8 by the arrows F615, the dashed line circle (no reference number) from which the arrows extend in FIG. 8 being the trace on the lower face 611 of the extension of the inner wall 6142 of the feed conduit 614. This divergence permits a flaring of the flow vein over the entire lower face 611 and therefore a homogeneous distribution of the particles at the inlet 605, as well as the obtaining within the compartment 60 of a homogeneous sedimentation bed entrained by the electrolyte, the average direction of flow being along the arrow F60. In all the feed devices shown in FIGS. 1 to 8, the actual or average inner diameter of the feed conduits is preferably at most equal to one third of the width of the compartment at the entrance to said compartment. Or even more preferably, this diameter is at most equal to one-fifth of said width.

On the other hand, in the compartments in accordance with the invention, the surface of the lower face may be formed only in part by the surface of the electron collector arranged on the electrolyte side, for example when said lower face is permeable locally to the electrolyte so as to permit an ionic connection through said lower face. Furthermore, in order to increase the electron exchanges, all or part of the side faces of the compartment may be made of an electron-conducting material, for instance of the same material as the surface of the collector. Thus, the lower half of the side faces 603 and 604 of the compartment 60 is formed of surface portions of the electron collector 6011 (FIG. 7). For this purpose, one can also make all or part of the faces of the feed devices of an electron-conducting material, for instance, of the same material as the surface of the electron collector.

In order to facilitate the evacuation of the electrolyte and of the particles from the compartment without disturbing the sedimentation bed in the compartment, it may be advantageous to impart to the evacuation device arrangements similar to those which were described in accordance with the invention for the feed devices.

Thus, for instance, as shown in FIG. 1 the evacuation device 12 of the generator 1 has a lower face 121 and an upper face 122, these faces being substantially flat and horizontal, and two opposite side faces 123 and 124, which are substantially flat and vertical. The side faces 123 and 124 form with each other the angle $\alpha'$ converging from the outlet 106 of the compartment 10 towards the evacuation conduit 125 of the evacuation device 12, this conduit 125 making it possible to evacuate from the generator 1 the electrolyte and the particles 21 which have not been entirely consumed during their passage in the generator 1. The angle $\alpha'$ is preferably selected at most equal to 20° and even more preferably at most equal to 15°. One thus brings about a uniform convergence of the streamlines of the flow downstream of the compartment 10 in the evacuation device 12, this convergence being represented by the arrows F21. When the sedimentation bed can be obtained in the vicinity of the inlet 105 of the compartment 10, it may be advantageous to have the side faces 103 and 104 of said compartment 10 converge by the angle $\alpha'$ over the greater portion or all of the compartment 10 so as to obtain such a uniform convergence of the streamlines in the compartment 10.

In analogous manner, the evacuation device 62 is made similar to the feed device 61. This evacuation device 62 has a lower face 621 and an upper face 622, these faces having identical semi-cyclic shapes $c'$ centered on the outlet 606 of the compartment 60, a semitoroidal side face 623, and an evacuation conduit 624 debouching onto the lower face 621 near the side face 623, the plane $P_6$ being also a plane of symmetry for the evacuation device 62.

In order to increase the electron exchanges, all or part of the faces of the evacuation devices of the generators in accordance with the invention may be made of electron-conducting materials, for instance, of the same materials as the electron collectors of the compartments with a sedimentation bed.

The compartment 60 is used, for instance, as an anode compartment in which the electrochemical oxidation of particles formed, at least in part, by an anode active metal, in particular particles of zinc in an alkaline electrolyte, takes place.

The surface of the collector 6011 arranged on the electrolyte side is made, for instance, of a metallic material. The upper face 602 of the compartment 60 is formed by the lower face of a thin hydrophilic separator 66 which is permeable to the electrolyte and impermeable to the zinc particles. This separator 66 is applied against the lower face 6511 of an air or oxygen diffusion cathode 651 arranged in the cathode compartment 65, the entrance and discharge of the gases being represented by the arrows F65 and F'65, respectively.

This electrode 651 is formed, for instance, in known manner essentially of carbon, silver, polytetrafluoroethylene and nickel. On the outside of the cell 6 having the anode compartment 60 and the cathode compartment 65, between the feed device 61 and the evacuation device 62 which are indicated symbolically by arrows in FIG. 9, an electrolyte and zinc particle reservoir 92 and a pump 91 permit the recycling of the electrolyte containing particles of zinc into cell 6 via the conduit 90.

The operating conditions of the generator 6 may, for instance, be as follows:

electrolyte: 4 to 12 N potassium hydroxide (4 to 12 mols of potassium hydroxide per liter), average size of the zinc particles introduced into the electrolyte: 10 to 20 microns, percentage by weight of zinc in the electrolyte: 20% to 30% of the weight of the electrolyte, i.e., a ratio of $v/V$, as previously defined, between 0.04 and 0.06 (This percentage is maintained practically constant by means of a feed device (not shown) discharging, for instance, into the reservoir 92.), average velocity of flow in the anode compartment: 10 m/minute to 30 m/minute, the distance $e_6$ between the lower face 601 and the upper face 602 of the compartment 60 is between 1 and 5 mm, for instance, substantially equal to 2 mm, the length $L_6$ of the compartment 60 is between 20 cm and 60 cm, the width $l_6$ of the compartment 60 is between 5 cm and 15 cm, the ratio $l_6/e_6$ being at least equal to 20.

The sedimentation is obtained despite the fineness of the initial zinc particles, because the initial fine particles agglomerate due to the basic electrolyte so as to form coarser particles whose average diameter is generally greater than or equal to 50 microns, which phenomenon takes place in general whatever the origin of the initial particles.

During the test, the concentration of oxidized zinc dissolved in the form of potassium zincate in the electrolyte is maintained less than a predetermined value equal, for instance, to about 120 g/liter in the case of 6N potassium hydroxide, so that the zinc particles are not made inactive by an accumulation of the reaction products on their surface or near their surface. This result can be obtained either by replacing the zincated electrolyte by a fresh solution of potassium hydroxide without zincate when its concentration of dissolved zinc becomes excessive, or by continuously regenerating the zincated electrolyte in an installation, not shown. One thus obtains continuously a power on the order of 50 watts for a current density equal substantially to 150 mA per $cm^2$ of the face 6511 of the cathode 651. The cathode 651 has been described as being a gas diffusion electrode. It is obvious that other types of electrodes could be used together with the compartment 60, for instance, a metallic-oxide electrode, particularly a silver oxide electrode, in the event that the particles used in the compartment 60 contain a metallic active material, and in particular zinc. Of course, the invention is not limited to the embodiments which have been described above, on basis of which one can contemplate other processes and embodiments without thereby going beyond the scope of the invention. Accordingly, the invention extends, for instance, to cells each of which has several compartments with a sedimentation bed and to compartments with a sedimentation bed each of which compartments has several collectors. Furthermore, one can contemplate a combination, in series or parallel, of a plurality of cells in accordance with the invention.

The invention also extends to generators whose systems for the recirculation of the electrolyte and particles comprise devices for the treatment of the electrolyte and/or particles, particularly electrolytic or chemical regeneration devices.

What is claimed is:

1. A process for the production of electric current utilizing electrochemical reactions in a generator comprising at least one cell having at least one compartment containing a liquid electrolyte and having an inlet, an outlet, an upper face and a lower face, the surface of the lower face being formed at least in part by all or part of the surface of at least one electron collector arranged on the electrolyte side, said process consisting in creating a flow through the compartment of the electrolyte containing solid particles which are at least partially active and/or solid particles transporting at least one active material, the density of the particles being greater than the density of the electrolyte, characterized by the fact that a divergence of the streamlines of the flow is brought about before the flow penetrates into the compartment so as to obtain a substantially homogeneous distribution of the particles at the inlet to the compartment over the entire width of the lower face, and characterized by the fact that, at least in a portion of the compartment, the particles move in the form of a sedimentation bed which is contiguous to the surface of the lower face and substantially homogeneous over the entire width of the lower face, the sedimentation bed being entrained by the electrolyte.

2. The process for the production of electric current according to claim 1, characterized by the fact that the sedimentation of the particles takes place before the flow penetrates into the compartment.

3. An electrochemical generator comprising at least one cell having at least one compartment containing a liquid electrolyte and comprising an inlet, an outlet, two side faces, an upper face and a lower face, the surface of said lower face being formed at least in part by all or part of the surface of at least one electron collector arranged on the electrolyte side, the compartment being connected by its inlet to a feed device and by its outlet to an evacuation device, said devices making it possible to create a flow through the compartment of the electrolyte containing at least partially active solid particles and/or solid particles transporting at least one active material, the density of the particles being greater than the density of the electrolyte, characterized by the fact that the feed device comprises means for bringing about a divergence of the streamlines of the flow in front of the inlet of the compartment so as to obtain a substantially homogeneous distribution of the particles at the inlet of the compartment over the entire width of the lower face and characterized by the fact that, at least in a portion of the compartment, there is a sedimentation bed of the particles which is contiguous to the surface of the lower face and substantially homogeneous over the entire width of the lower face, the sedimentation bed being entrained by the electrolyte.

4. The electrochemical generator according to claim 3, characterized by the fact that the feed device comprises a lower face, an upper face, two opposite side faces forming with each other an angle $\alpha$ which diverges towards the inlet of the compartment, and a feed conduit which connects to the two side faces at the place where they are closest together.

5. The electrochemical generator according to claim 4, characterized by the fact that the distance between the lower and upper faces of the feed device is substantially constant, and by the fact that the angle $\alpha$ is at most equal to 20°.

6. The electrochemical generator according to claim 5, characterized by the fact that the angle $\alpha$ is at most equal to 15°.

7. The electrochemical generator according to claim 4, characterized by the fact that the distance between the lower and upper faces of the feed device is reduced progressively, over at least a part of said device, in the direction towards the inlet of the compartment.

8. The electrochemical generator according to claim 4, characterized by the fact that the lower face of the feed device is flat.

9. The electrochemical generator according to claim 8, characterized by the fact that the average direction of flow in the feed conduit is parallel to the lower face of the feed device, at least at the place where said conduit connects to the two opposite side faces.

10. The electrochemical generator according to claim 4, characterized by the fact that the feed conduit of the feed device forms at least one elbow.

11. The electrochemical generator according to claim 10, characterized by the fact that the elbow of the feed conduit forms a modification $\beta$ of the average direction of flow in the feed conduit of between 70° and 90°.

12. The electrochemical generator according to claim 4, characterized by the fact that the feed device has, at least in the portion thereof where the side faces form the angle of divergence $\alpha$ between each other, a plane of symmetry perpendicular to the lower face of the feed device.

13. The electrochemical generator according to claim 4, characterized by the fact that the feed device comprises an even number, greater than 2, of opposite side faces forming in pairs with each other an angle $\alpha$ which diverges towards the inlet of the compartment, and an even number of feed conduits, each connected to a pair of divergent side faces at the place where they are closest together.

14. The electrochemical generator according to claim 3, characterized by the fact that the feed device comprises an upper face, a lower face, at least one side face, and a feed conduit, said feed conduit debouching onto the upper face.

15. The electrochemical generator according to claim 14, characterized by the fact that the feed conduit is located in the vicinity of the portion of the side face opposite the inlet of the compartment.

16. The electrochemical generator according to claim 15, characterized by the fact that the feed device has a plane of symmetry perpendicular to the lower face of the feed device, and by the fact that the average direction of flow in the feed conduit forms an angle $\gamma$ of between 20° and 90° with the trace of the plane of symmetry on the lower face of the feed device, the trace being directed towards the inlet of the compartment.

17. The electrochemical generator according to claim 16, characterized by the fact that the angle $\gamma$ is between 75° and 85°.

18. The electrochemical generator according to claim 14, characterized by the fact that the distance between the upper end of the feed conduit and the lower face of the feed device is at least equal to $2D_c$, $D_c$ being the actual or average inner diameter of the feed conduit.

19. The electrochemical generator according to claim 18, characterized by the fact that the distance between the upper end of the feed conduit and the lower face of the feed device is at least equal to $4D_c$.

20. The electrochemical generator according to claim 14, characterized by the fact that the lower face and the upper face of the feed device are limited by semi-circles whose centers are located on the inlet of the compartment.

21. The electrochemical generator according to claim 14, characterized by the fact that the lower face and the upper face of the feed device are flat and parallel.

22. The electrochemical generator according to claim 3, characterized by the fact that the lower face and the upper face of the feed device are connected tangentially to the lower face and the upper face, respectively, of the compartment, and by the fact that the side face or faces leading to the inlet of the compartment are connected tangentially to the side faces of the compartment.

23. The electrochemical generator according to claim 3, characterized by the fact that the actual or average inner diameter of the feed conduit is at most equal to one-third of the width of the compartment at the inlet to the compartment.

24. The electrochemical generator according to claim 23, characterized by the fact that the inner diameter is at most equal to one-fifth of the said width.

25. The electrochemical generator according to claim 12, characterized by the fact that the plane of symmetry is the plane of symmetry for the compartment.

26. The electrochemical generator according to claim 3, characterized by the fact that the evacuation device has a plurality of faces, these faces being arranged in such a manner as to bring about a convergence of the streamlines.

27. The electrochemical generator according to claim 3, characterized by the fact that at least a part of the side faces of the compartment is made of an electron-conducting material, and/or by the fact that at least a part of the faces of the feed device and/or of the evacuation device is made of an electron-conducting material.

28. The electrochemical generator according to claim 3, characterized by the fact that it comprises a recycling means which connects the evacuation device to the feed device.

29. The electrochemical generator according to claim 3, characterized by the fact that the compartment is an anode compartment, the particles are formed in whole or in part of an anode active metal, and the compartment is ionically connected by its upper face and/or its lower face with at least one cathode compartment having a cathode with an active material.

30. The electrochemical generator according to claim 29, characterized by the fact that the anode active material is zinc, the cathode active material is oxygen or at least a compound of oxygen, and the electrolyte is an alkaline electrolyte.

* * * * *

UNITED STATES PATENT OFFICE
CERTIFICATE OF CORRECTION

Patent No. 4,101,717  Dated July 18, 1978

Inventor(s) Pierre Durand

It is certified that error appears in the above-identified patent and that said Letters Patent are hereby corrected as shown below:

First page, third line of ABSTRACT, "contaning" should read -- containing --. Col. 1, line 43, "Ser. No. 821,766" should read -- Ser. No. 821,760 --. Col. 2, line 51, "poiseville" should read -- poiseuille --; line 53, "d is at least equal" should read -- D is at least equal --; line 57, "poiseville" should read -- poiseuille --. Col. 4, line 59, "1/DC" should read -- $\frac{1}{D_C}$ --; lines 62 and 63, "4 S/P" should read -- $4 \frac{S}{P}$ --.

Signed and Sealed this

Twenty-ninth Day of May 1979

[SEAL]

Attest:

RUTH C. MASON  
Attesting Officer

DONALD W. BANNER  
Commissioner of Patents and Trademarks